US010135778B2

(12) United States Patent
Fitzner

(10) Patent No.: US 10,135,778 B2
(45) Date of Patent: Nov. 20, 2018

(54) CUSTOM ENCODED MESSAGES AMONGST A CUSTOMIZED SOCIAL GROUP

(71) Applicant: Ishmael Interactive, LLC, Los Angeles, CA (US)

(72) Inventor: Ana Monroe Fitzner, Los Angeles, CA (US)

(73) Assignee: ISHMAEL INTERACTIVE, LLC, Los Angeles, CA (US)

( * ) Notice: Subject to any disclaimer, the term of this patent is extended or adjusted under 35 U.S.C. 154(b) by 208 days.

(21) Appl. No.: 14/942,324

(22) Filed: Nov. 16, 2015

(65) Prior Publication Data

US 2016/0142362 A1 May 19, 2016

Related U.S. Application Data

(60) Provisional application No. 62/081,433, filed on Nov. 18, 2014.

(51) Int. Cl.
*H04L 12/58* (2006.01)
(52) U.S. Cl.
CPC ............ *H04L 51/32* (2013.01); *H04L 51/063* (2013.01); *H04L 51/066* (2013.01)
(58) Field of Classification Search
CPC ...... H04L 51/32; H04L 51/066; H04L 51/063
See application file for complete search history.

(56) References Cited

U.S. PATENT DOCUMENTS

| 7,609,686 | B1 * | 10/2009 | McNamara | G06Q 30/0241 |
| | | | | 370/356 |
| 8,775,526 | B2 * | 7/2014 | Lorch | H04M 1/7253 |
| | | | | 455/556.1 |
| 9,621,489 | B2 * | 4/2017 | Carey | H04L 51/04 |
| 9,787,617 | B2 * | 10/2017 | Ciavatta | H04L 51/08 |
| 2005/0228876 | A1 * | 10/2005 | Malik | G06Q 50/01 |
| | | | | 709/223 |
| 2006/0010324 | A1 * | 1/2006 | Appenzeller | H04L 9/0866 |
| | | | | 713/171 |
| 2006/0041848 | A1 * | 2/2006 | Lira | G06Q 10/107 |
| | | | | 715/805 |
| 2007/0234410 | A1 * | 10/2007 | Geller | G06F 21/31 |
| | | | | 726/8 |
| 2008/0031447 | A1 * | 2/2008 | Geshwind | H04L 9/0822 |
| | | | | 380/46 |

(Continued)

*Primary Examiner* — Michael A Keller
*Assistant Examiner* — Javier O Guzman
(74) *Attorney, Agent, or Firm* — Loeb & Loeb LLP

(57) ABSTRACT

A system and method for sending custom encoded messages amongst a customized social group. A selection of intended recipients within a subgroup from a list of contacts is received on a client device. It is determined whether all of the selected recipients are capable of receiving a custom encoded message. If it is negative, the method includes sending an invitation email to one or more of the selected recipients. If it is affirmative: the method includes receiving a message from the user intended for the selected recipient. An assignment of a graphical symbol to an alphabet is received from the user. The assignment associating with all of the intended recipients is stored in a memory of the client device. The assignment and the message are transmitted to a remote processor for converting the message to the custom encoded message based on the assignment and transmitting them to the device.

20 Claims, 12 Drawing Sheets

(56) References Cited

U.S. PATENT DOCUMENTS

| | | | | |
|---|---|---|---|---|
| 2008/0126022 A1* | 5/2008 | Hoguet | ............... | G06F 17/5081 703/1 |
| 2009/0013087 A1* | 1/2009 | Lorch | ............... | H04M 1/72552 709/232 |
| 2009/0271616 A1* | 10/2009 | Hofstadter | ............... | H04L 63/08 713/153 |
| 2010/0137009 A1* | 6/2010 | Jeong | .................... | H04L 51/066 455/466 |
| 2010/0179991 A1* | 7/2010 | Lorch | ................ | H04M 1/7253 709/206 |
| 2012/0162350 A1* | 6/2012 | Lee | ......................... | H04L 51/08 348/14.03 |
| 2013/0043302 A1* | 2/2013 | Powlen | ............. | G06F 17/30725 235/375 |
| 2013/0231143 A1* | 9/2013 | Erskine | .................. | H04W 4/12 455/466 |
| 2015/0255057 A1* | 9/2015 | Levy | .................... | G06F 17/212 704/260 |

\* cited by examiner

FIG. 6
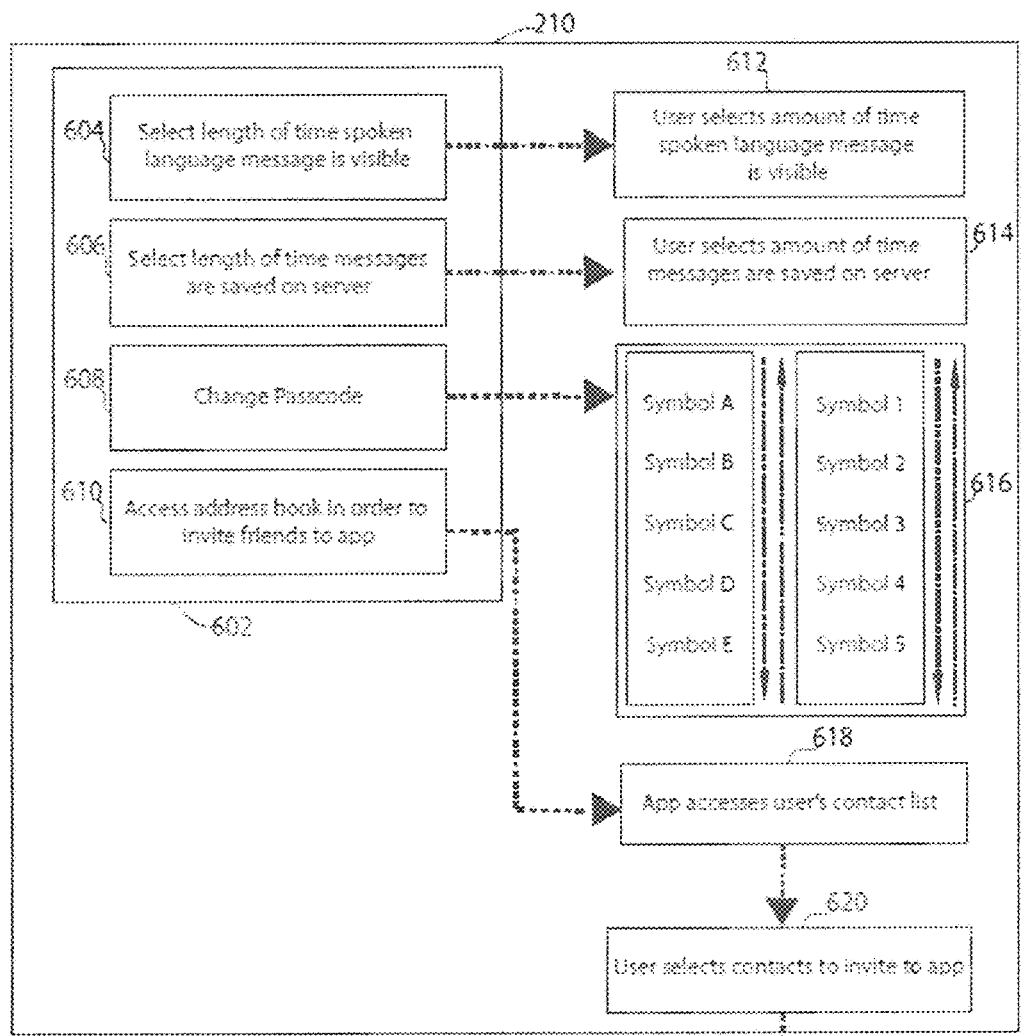
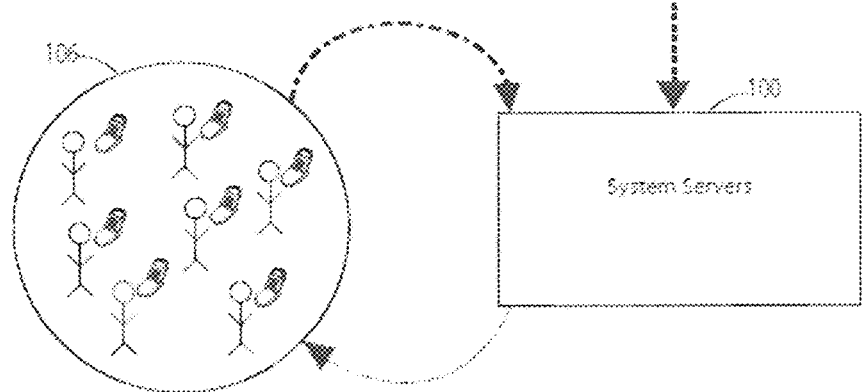

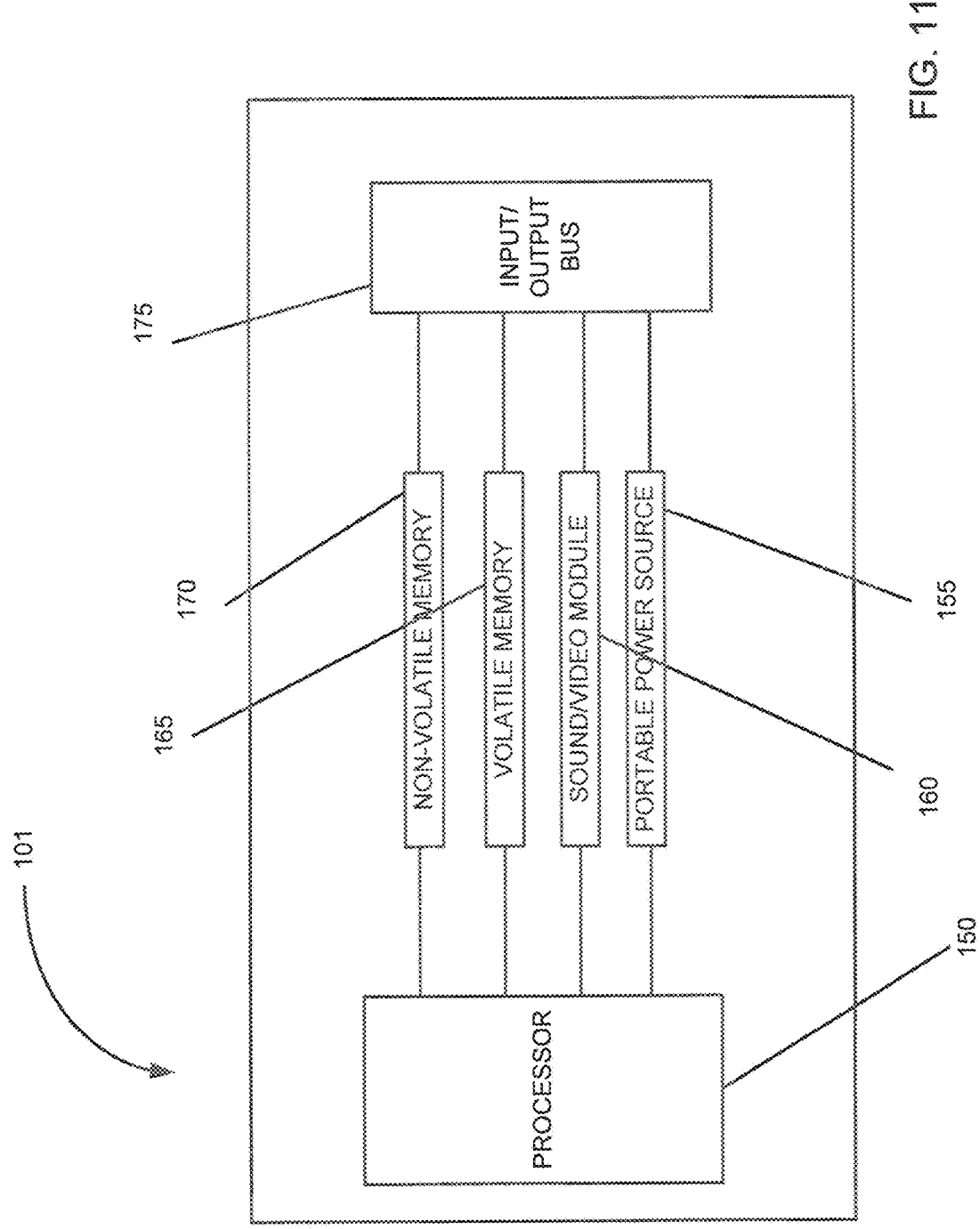

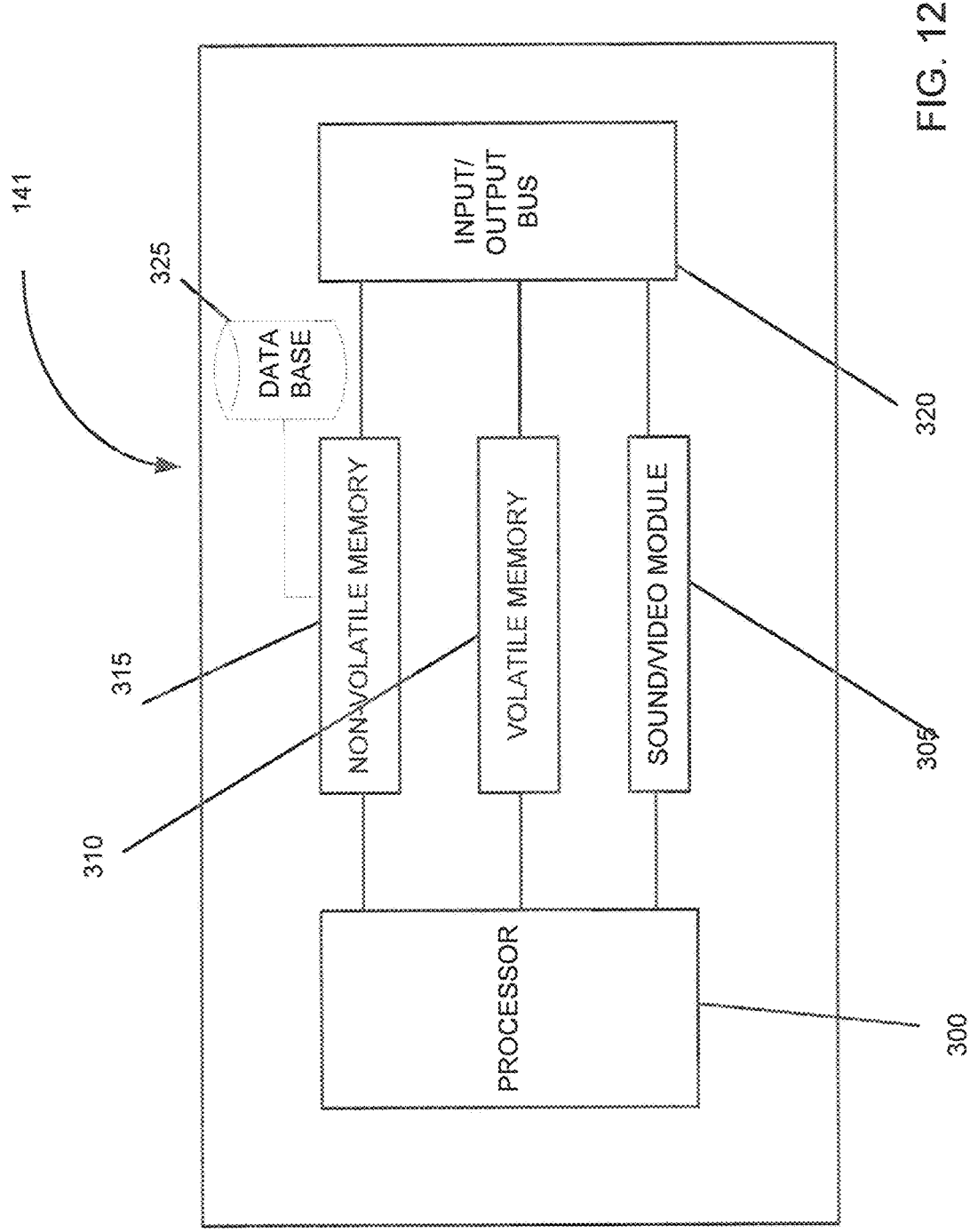

CUSTOM ENCODED MESSAGES AMONGST A CUSTOMIZED SOCIAL GROUP

CROSS-REFERENCE TO RELATED APPLICATION

This is a nonprovisional application of provisional application, Ser. No. 62/081,433, filed on Nov. 18, 2014, whose disclosure is incorporated by references in its entirety herein.

BACKGROUND

Field

The present disclosure generally relates to communication and more particularly to user based customization of codes for text based communication with a group of users.

Description of the Related Art

Smart phones and social networks currently allow users to send, upload, link, create, and share messages with other users. Email and text message communication can be easily read off the screen display of a recipient. It is also common for certain communications where the messages are encrypted by encryption techniques known in the art. In another example, it is known for a user to create custom shortcuts or autocorrect key combinations to convert frequent typographical errors or frequently used terms or abbreviations to correct or desirable ones. It is also common to find automatic conversions of specific combination of punctuation marks to be converted to graphical symbols, such as a combination of ":" and ")" may be changed to a smiley face graphical symbol. Prior technologies typically save these custom settings in user profiles or user configuration settings. Sometimes these profiles or settings may be backed-up and may be restored if the user has to reinstall the application, app, or software on a different device.

However, on an application or app level, the current technology fails to efficiently enable the user to share his or her custom message content codes with a selected group of recipients. In other words, it is impossible to create a custom, random or arbitrary message content for conversion to a custom encoded message content based on a set of key-mapping assignments created by a user for a subset of all possible recipients. Moreover, current technologies fail to allow recipients in the specific group to easily update or modify the set of key-mapping.

SUMMARY

Aspects of the invention overcome the prior technologies by expanding the capabilities of custom encoded message contents to a specific subset of all possible recipients. By enabling a user to create a set of key-symbol assignments and sending a copy of the set of assignments to a server, the server may conveniently and quickly convert the message for the user. The server may in term sends the original message content, the encoded or converted message content, and/or the assignments to the intended recipients such that the recipients not only could understand and read the encoded message content, but also could modify the set of assignments. The modification may further transmitted to all members in the subset.

The disclosed subject matter relates to a computer-implemented method for sending custom encoded message contents amongst a customized social group. The method includes selecting a social group containing at least one social contact, setting a code, and sending a message to the social group encoded with the code.

The disclosed subject matter further relates to a system for sending custom encoded messages. The system includes one or more processor(s) and a memory containing processor-executable instructions. When executed by the processor(s), the system receives a selection of a social group containing at least one social contact. The system also receives a selection of a code from the user, receives a message, and sends the message to the social group encoded with the code.

The disclosed subject matter also relates to a machine-executable storage medium comprising machine-readable instructions for sending custom encoded messages amongst a customized social group. The method includes receiving a selection of a social group containing at least one social contact. The system also receives a selection of a code from the user, receives a message, and sends the message to the social group encoded with the code.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

According to one embodiment, a computer-implemented method sends custom encoded messages amongst a customized social group. The method may receive from a user a selection of intended recipients within a subgroup from a list of contacts on a client device. The method may determine whether all of the selected recipients are capable of receiving a custom encoded message. In response to the determination being negative, the method includes sending an invitation email to one or more of the selected recipients who are not capable of receiving the custom encoded message. The invitation email includes information to enable a device of the one or more of the intended recipients to receive the custom encoded message. If on the other hand, in response to the determination being affirmative: the method includes receiving a message from the user intended for the selected recipient. An assignment of a graphical symbol to an alphabet is received from the user. The assignment associating with all of the intended recipients is stored in a memory of the client device. The assignment and the message are transmitted to a remote processor for converting the message to a custom encoded message based on the assignment. The remote process is configured to transmit the custom encoded message, the message, and the assignment to the device.

According to another embodiment, a computer-implemented method for sending a custom encoded message from a message amongst a customized social group includes receiving from a user a selection of intended recipients within a subgroup from a list of contacts. It is determined whether all of the selected recipients are capable of receiving a custom encoded message. In response to the determination being affirmative, the method further includes receiving a message from the user intended for the selected recipient. An assignment of a graphical symbol to an alphabet is received from the user. The assignment associating with all of the intended recipients is stored in a memory of the client device. The assignment and the message are transmitted to a remote processor for converting the message to a custom encoded message based on the assignment. The remote process is configured to transmit the custom encoded message, the message, and the assignment to the device. The device further provides the custom encoded message to the intended recipients. In an alternative embodiment, the device may first provide the message within a determined period before providing the custom encoded message.

According to yet another embodiment, a computer-networked system for sending a custom encoded message from a text-based message amongst a subset of a user-defined social subgroup among social groups includes a processor configured to execute processor-executable instructions stored in a memory accessible by the processor via a computing network. The processor may be configured to execute processor-executable instructions to receive from a client device associated with a user a selection of intended recipients within the subgroup from a list of contacts of the user. In one example, the processor may be located remotely from the client device. The processor may be configured to execute processor-executable instructions to receive from the client device the text-based message and an assignment. The assignment assigns or matches a graphical symbol to an alphabet. The processor may be configured to execute processor-executable instructions to store in the memory the assignment and the text-based message. The processor may be further configured to execute processor-executable instructions to convert the text-based message to a custom encoded message based on the assignment. The processor may be configured to execute processor-executable instructions to transmit the converted custom encoded message, the text-based message and the assignment to one or more devices of the intended recipients via the computing network.

BRIEF DESCRIPTION OF THE DRAWINGS

Certain features of the subject technology are set forth in the appended claims. However, for the purpose of explanation, several aspects of the subject technology are set forth in the following figures.

FIG. 6 is a block diagram detail regarding the selection of settings (a detail of block 210 of FIG. 2) according to one embodiment of the invention.

FIG. 11 is an illustration of a portable computing device which is physically configured according to embodiments of the method according to one embodiment of the invention.

FIG. 12 is an illustration of a server type computing device which is physically configured according to the embodiments of the method according to one embodiment of the invention.

Corresponding reference characters indicate corresponding parts throughout the drawings.

DETAILED DESCRIPTION

In the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

One technical advantage of the subject technology is to provide an entertaining code for a social group using emojis. By allowing the user to create and change the social group and the code itself at will, a private language can be created and can evolve, providing a technical advantage of the subject technology. Another goal of the invention is to prove a mechanism to strengthen the ability of user to communicate with individuals and groups by allowing users to form groups and foster privacy in communication by allowing user's private control over the group's communication. The popularity and entertainment value of emojis additionally provides a means to create custom sets of code alphabets for use with the system for limited distribution in geographical areas or for distribution to members of limited groups. Accordingly, a system and method for custom encoding messages amongst a customized social group is disclosed.

Figure 1:
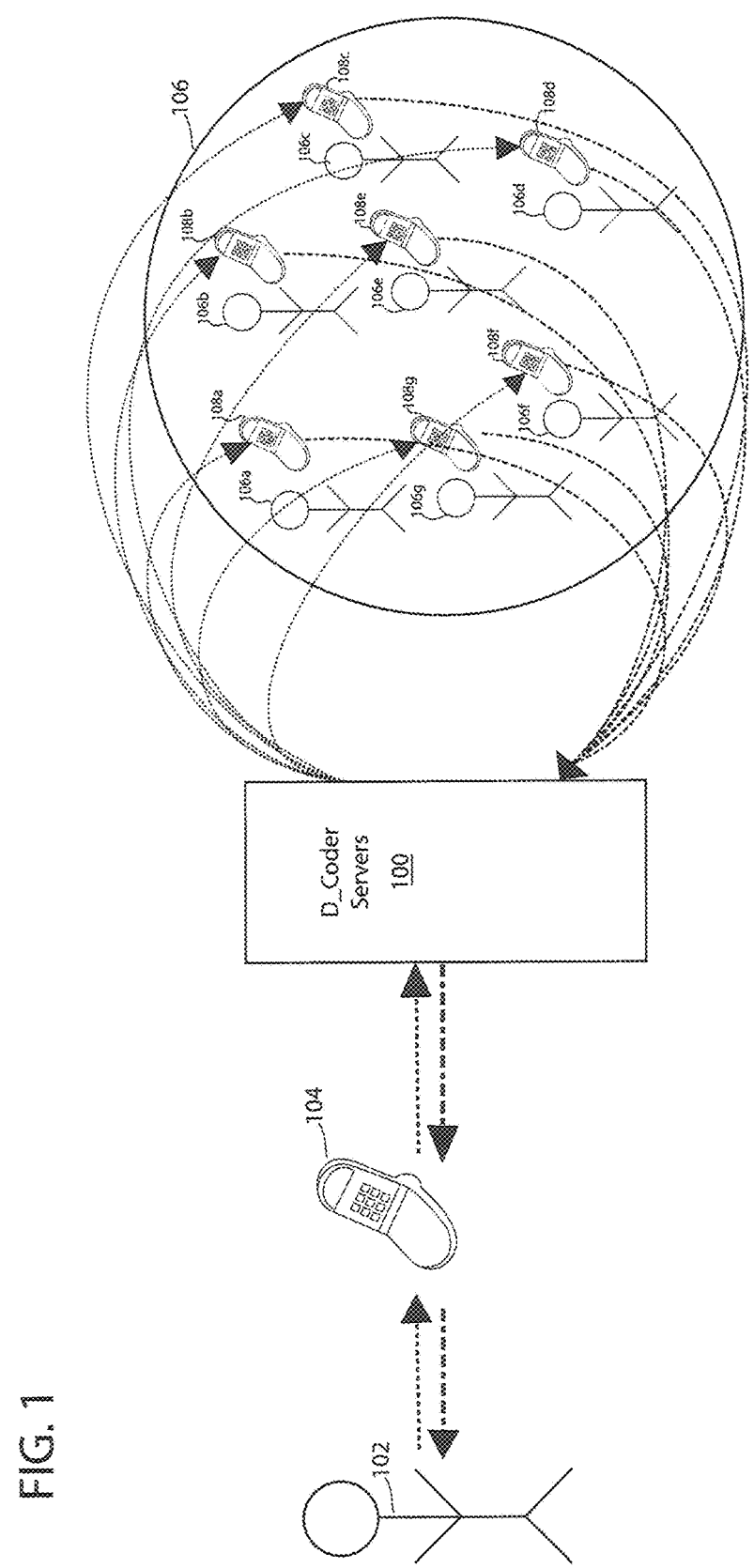
FIG. 1 illustrates an example system for custom encoded messages amongst a customized social group according to one embodiment of the invention.

FIG. 1 illustrates an example system for custom encoded messages amongst a customized social group. Users 102 and 106*a-g* interact with the system of the subject technology which includes client devices 104 and 108*a-g*, D_Coder servers 100 and a network connecting the client devices 104.

Figure 2:
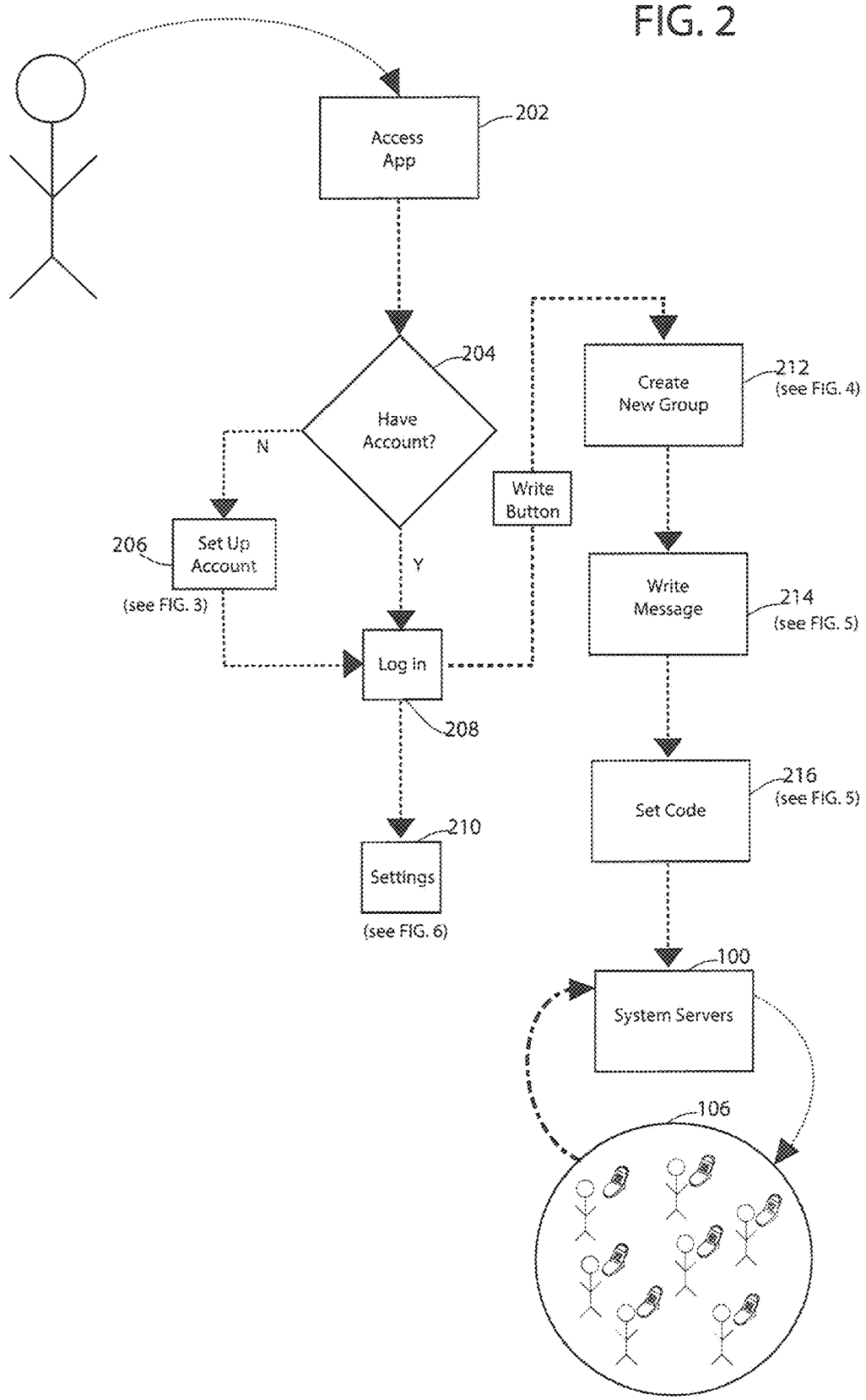
FIG. 2 are flow diagrams illustrating methods in accordance with the subject technology according to one embodiment of the invention.
Figure 3:
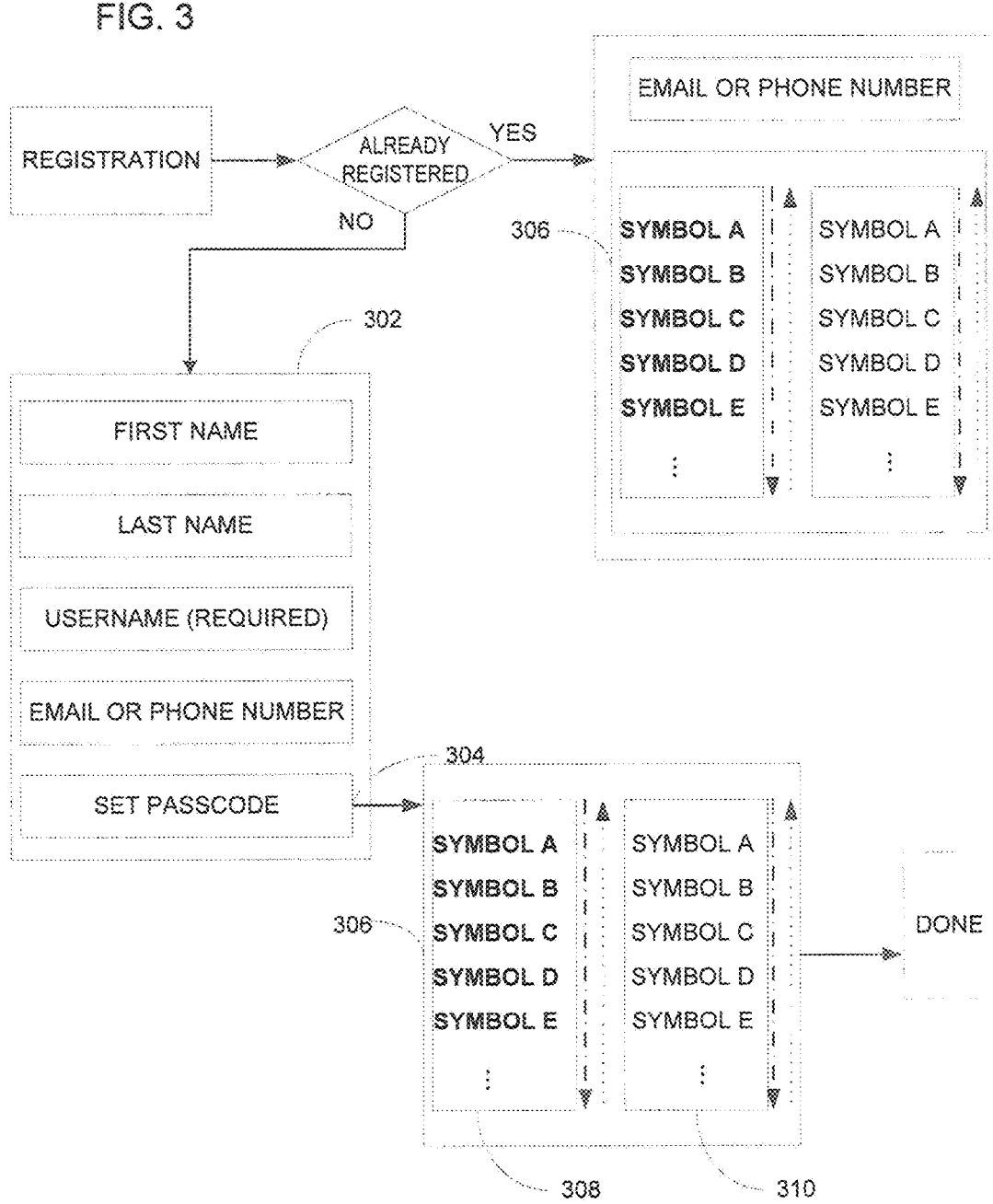
FIG. 3 is a block diagram showing a detail regarding new account set up for a user (a detail of block 206 of FIG. 3) according to one embodiment of the invention.
Figure 4:
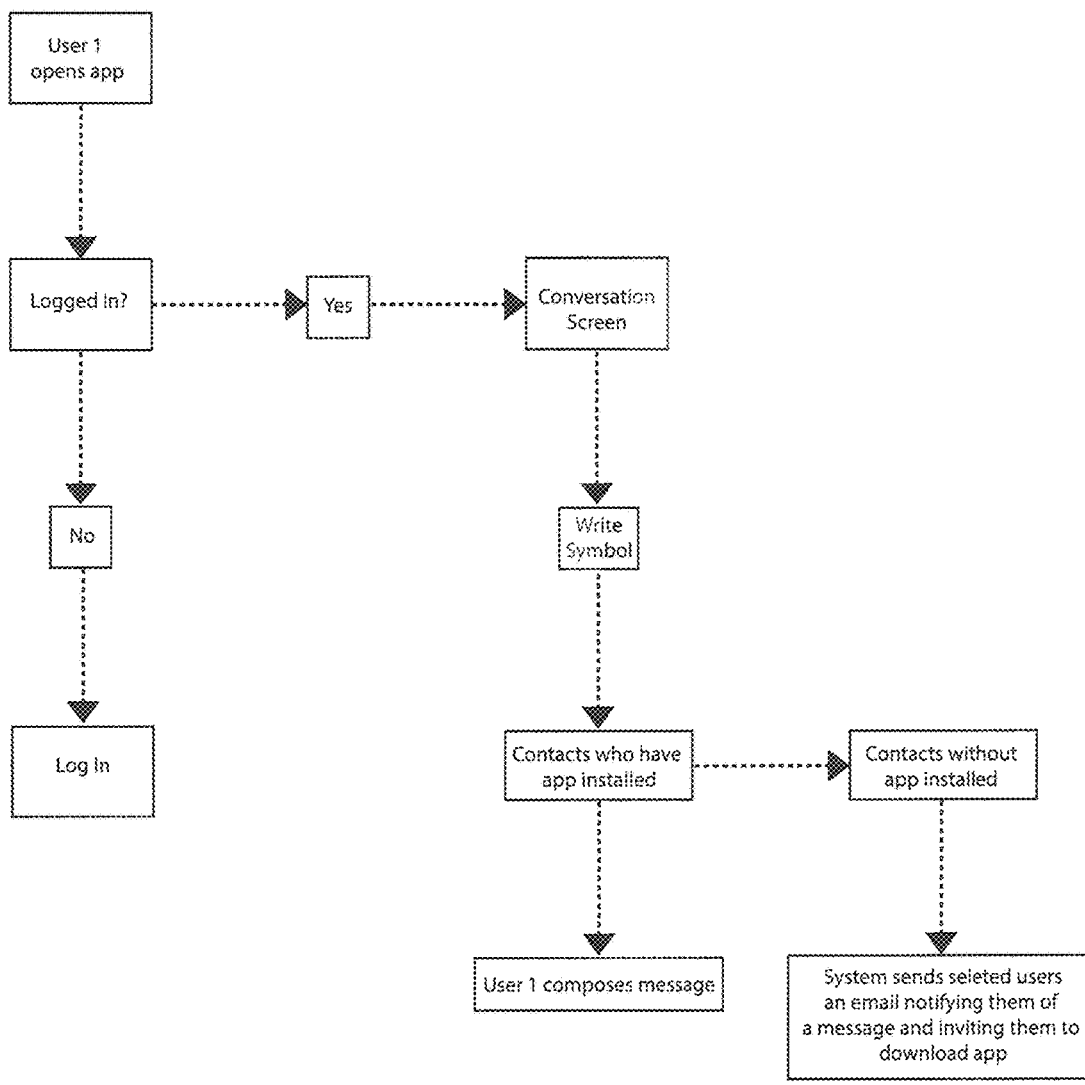
FIG. 4 is a block diagram showing a detail regarding the creation of a new group (a detail of block 212 of FIG. 2) according to one embodiment of the invention.

FIGS. 2-4 are flow diagrams illustrating methods in accordance with the subject technology. FIG. 2 shows a high level overview of how the system and method of the subject technology. In one embodiment, a user, such as user 102, accesses an application (or "app" as an abbreviation), such as an app 202 that embodies features of the invention. The user may access the app 202 on her user device in block 202. If the user does not have an account, the user is first asked to set up an account. As shown in FIG. 3, the user is prompted through several registration screens 302 requesting user information including a passcode 304. The passcode includes the selection of two symbols (i.e., 308 and 310) in 306. The user may be asked to select two symbols that match in 306. The symbols may be a selection of two emojis that the user may select by flicking up and down as the symbols move in a carousel-like fashion. The term "emojis" as used, for example, herein encompasses its plain and ordinary meaning, including, but not limited to the term emotion icon. The term also includes symbols, picture graphics, icons, markings, or other thing that represents or stands for or symbolizes something else a character or alphanumeric character. In order to use the application, the user may be asked to re-enter the passcode, much like a multiple dial combination lock, in order to gain access to the application or the app. If the user navigates to the registration screen, but is already registered, the user may enter his email or phone number and password.

Returning to FIG. 2, once the user has set up an account, or if the user already has an account, the user is asked to log-in at block 204, the user may then access his or her settings in block 210.

In the settings section, as shown in FIG. 6, the user may customize the application using a set of settings 602. For example, settings include setting various time thresholds for saving messages, viewing text, access control, and passcode. Moreover, setting options such as "select length of time spoken language message is visible" setting 604, "select length of time messages are saved on server" setting 606, "change passcode" setting 608, and "access address book in order to invite friends to app" setting may be included in the set of settings 602. Each of the settings may include additional options. For example, the setting option 604 may further include an additional configuration of "user selects amount of time spoken language message is visible" 612. Similarly, the setting option 606 may include an additional configuration of "user selects amount of time messages are saved on server" 614. The setting option 608 may include a passcode modification mechanism 616 as shown as 306 in FIG. 3. The setting option 610 may include additional configurations such as "App accesses user's contact list" 618 and "user selects contacts to invite to app" 620.

Not shown, but contemplated, are additional settings such as color schemes, selection of emoji character packages, menus to purchase additional emoji packages, and additional options, such as selecting a length of time that the emoji code is displayed, setting an "autodestruct" time or a determined period for a message after which the message will disappear from the screen, setting a "reveal" time which may be a short period of time or a threshold time after which the un-coded message will appear after receipt. Other additional times may be a "scramble time" after which the message may be scrambled to another set of emoji that are not meaningful to the recipient as a second type of "autodestruct."

Returning back to the overview in FIG. 2, the user may simply choose to draft a message after logging in in block 208. After selecting the write button, the user selects the recipients in block 212, writes the message in block 214, sets the code in block 216 and sends the encoded message to the recipients 106 via the network and system servers 100. If, during the designation of the group of recipients it is established that social contacts selected for the message do not have the application, an email message may be sent to the recipient as shown in FIG. 4. In an alternative embodiment, if some, but not all, members of the designated group are users of the system, encoded messages may be sent to members of the group who are users of the application and un-coded messages may be sent to members of the group who are not users of the application. In yet another alternative embodiment, the message may only be sent to users who are users of the application. In some embodiments, the user may be informed of whether the members of the group are users of the application and asked whether to send an invitation, whether to send an un-coded message to non-users contacts, whether to cancel the message to non-user contacts, or whether to proceed with sending the encoded message to all selected contacts of the group.

Figure 5:
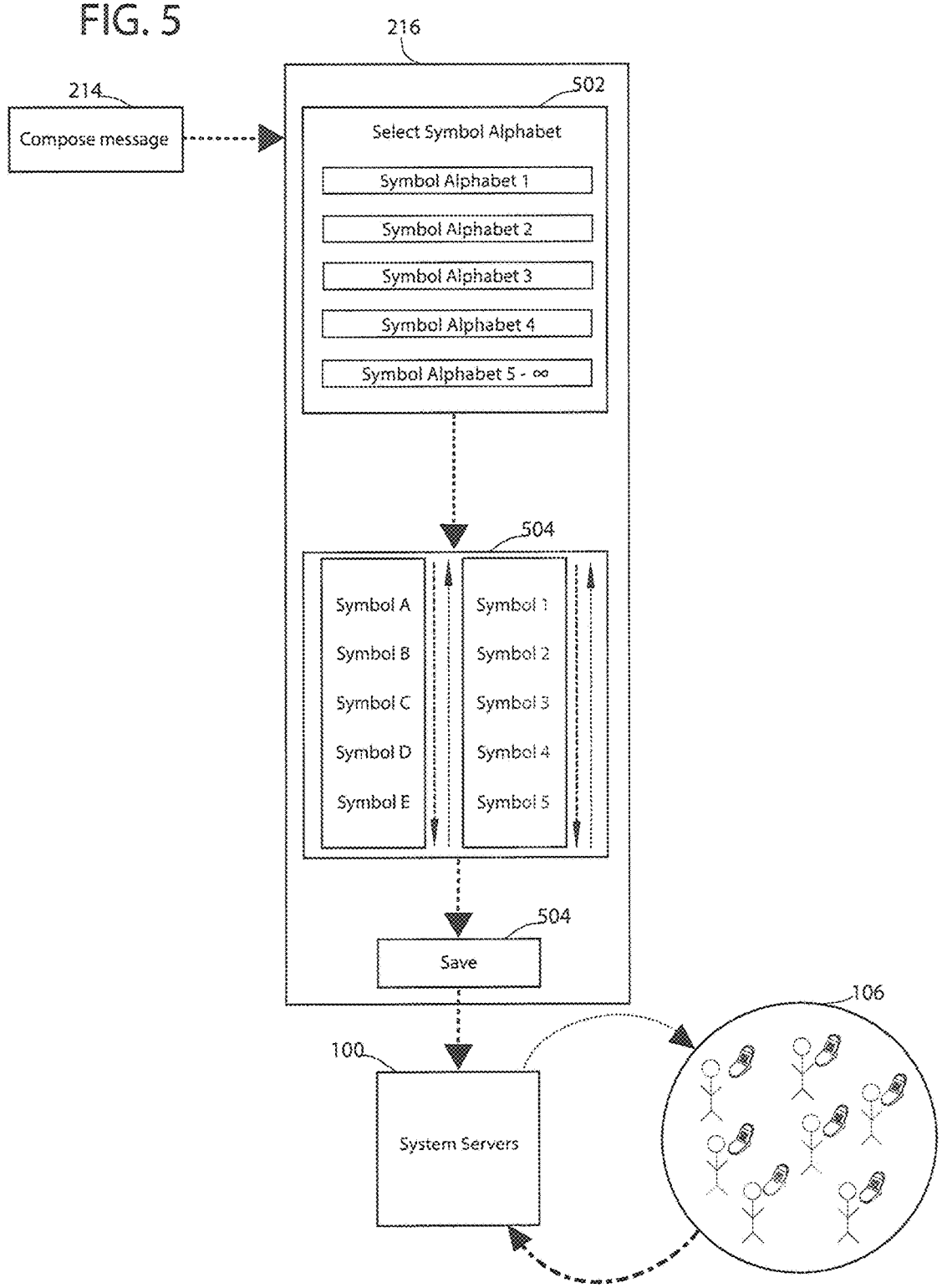
FIG. 5 is a block diagram showing a detail regarding the selection of code (a detail of blocks 214 and 216 of FIG. 2) according to one embodiment of the invention.

Referring now to FIG. 5, a diagram illustrates in detail the selection of user selection of the symbol to code alphabet. In 502, the user selects from various sets of emojis. The user may be provided with various code alphabets as a promotional offer, a packaged of emojis, such as a package of emojis with a theme, or may be a specific set of emojis provided an employer. Alphabets may additionally be available for purchase. In 504, the user then uses a two carousel-like wheel, similar to the passcode set up block 616 as shown in FIG. 6 to assign the set of symbols to alphanumeric characters. This assignment or assigned code once assigned by the user who has selected the group, the assigned code is used to encode conversations within the selected group. In one embodiment, the assigned code is saved in a memory of the client device such that the app may access it. In another example, the assigned code may be part of a promotional offer or for-purchase assigned code. In this case, the assigned code as part of the promotional offer would be downloaded to the client device upon purchasing of the assigned code. Similarly, for example, the assigned code as part of the for-purchase code would be downloaded to the client device upon purchasing of the assigned code. In one embodiment of the invention any member of the group may change the assigned code and an email will be sent to the group notifying the group of the change. In another embodiment of the invention, the first message will arrive un-coded until each member sends a message using the new code. A user may be able to select how changes in code will be dealt with via the settings.

Figure 7:
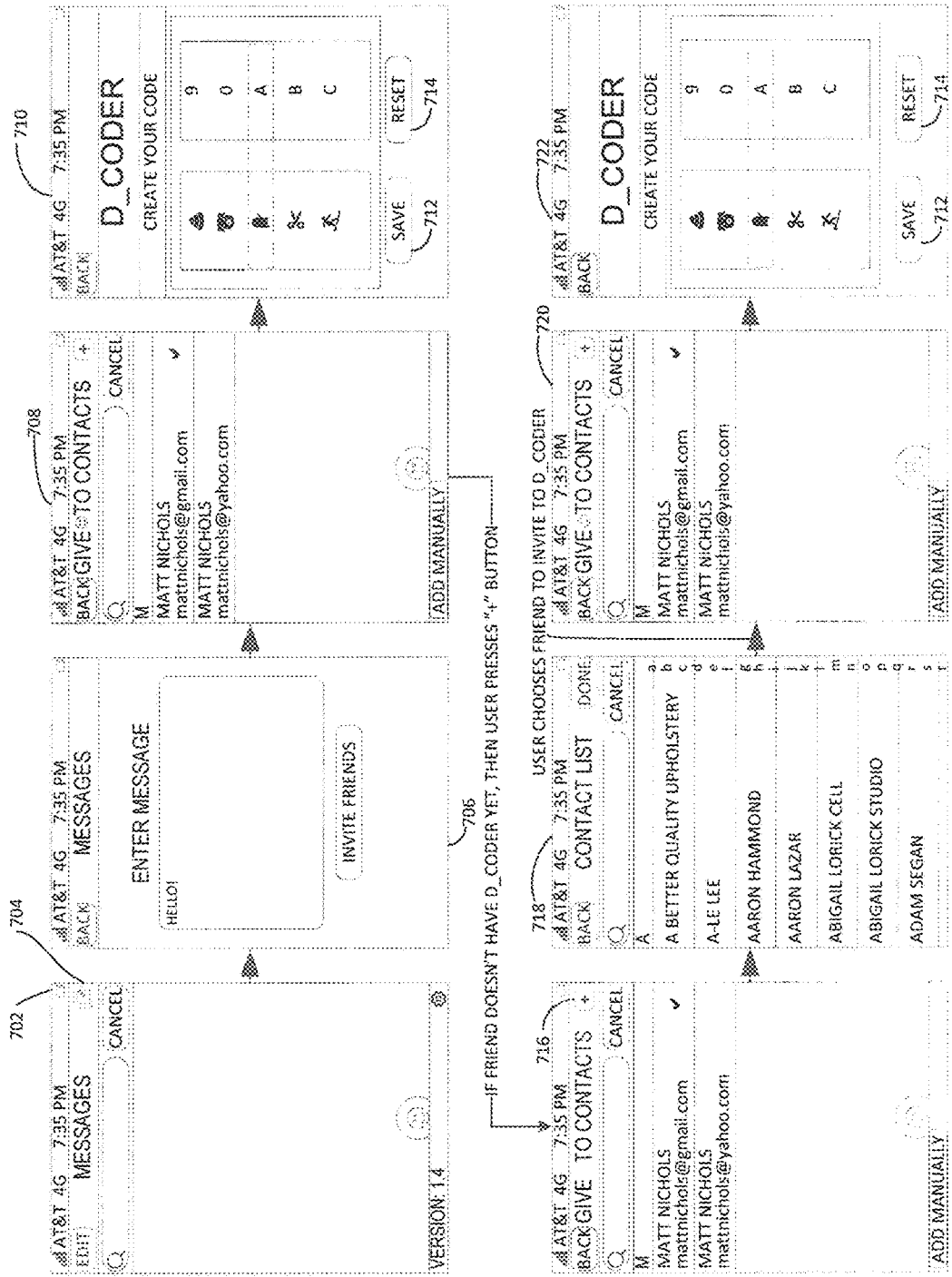
FIGS. 7-8 illustrate various flow diagrams showing exemplary graphical user interfaces of the subject technology in accordance with embodiments of the subject technology according to one embodiment of the invention.
Figure 8:
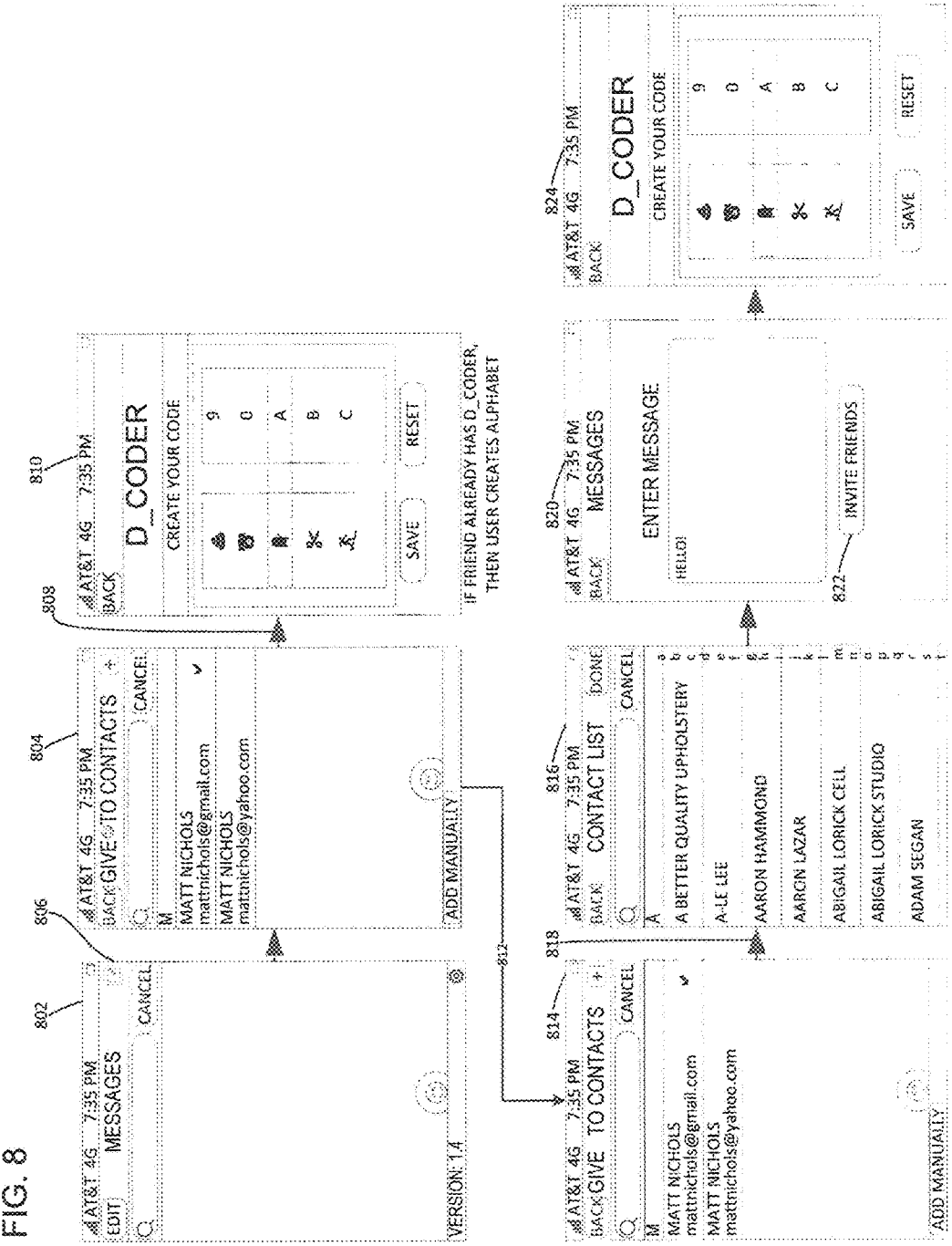

FIGS. 7-8 illustrate various flow diagrams showing exemplary graphical user interfaces of the subject technology in accordance with embodiments of the subject technology. For example, FIG. 7 illustrates the follow diagrams using exemplary graphical user interfaces (GUI) on mobile or portable devices. For example, a user, such as the user 102, wants or wishes to start a new conversation using an exemplary GUI 702. The user may select an icon "new message" 704 to start the new conversation creation. The user is then transitioned to a message screen GUI 706 to enter the message in a given language, such as English. In one example, the user may start to type the message and, at the conclusion of it, selects or hits "invite friends" button the GUI 706. In another embodiment, the user is shown a GUI 708 to select one or more recipients of the message from, for example, a list of contacts. In one example, a "check" mark may be an exemplary indicator of the user's selection to select the contact.

At this time, if the selected recipient is determined to have D_CODER, based on descriptions above, the user is transitioned to a GUI 710 to create the message, using for example, the carousel-like UI to match an icon or emoji to an alphabet. Once the user is finished with the message creation, the user may select a "SAVE" button 712 to save the message creation or a "RESET" button 714 to restart the message creation. If, on the other hand, the selected is determined not to have D_CODER, the user may press a button 716, an add button represented by a "+" sign, to add the user to be part of D_CODER. In one example, the user is shown a GUI 718 to select the intended recipient. In one example, the list of contacts of the user in his or her device may be made available for selection. Once selected, the user is transitioned to a GUI 720 such that the user is shown the selection of the intended recipient. A GUI 722 is shown, similar to that of the GUI 710, to create the message for the intended recipient.

Alternatively, referring to FIG. 8, the user may wish to generate the message from a GUI 802 and transitioned to a GUI 804 by selecting the intended recipient first, after pressing or selecting a "write" button 806. If the intended recipient already has D_CODER, the user chooses or selects the intended recipient to send the message to, and the user is transitioned via 808 to a GUI 810 to create the alphabet. If, on the other hand, the intended recipient is determined not to have the D_CODER, the user is transitioned via 812 to a GUI 814. A GUI 816 shows a list of contacts the user may maintain on his or her device and is transitioned from the GUI 814 via 816. The user is next transitioned to a message screen GUI 820 to compose the message, such as "HELLO!". Upon completing the message, the user may select an "INVITE FRIENDS" button 822 before transitioning to a GUI 824 to create the alphabet.

Figure 9:
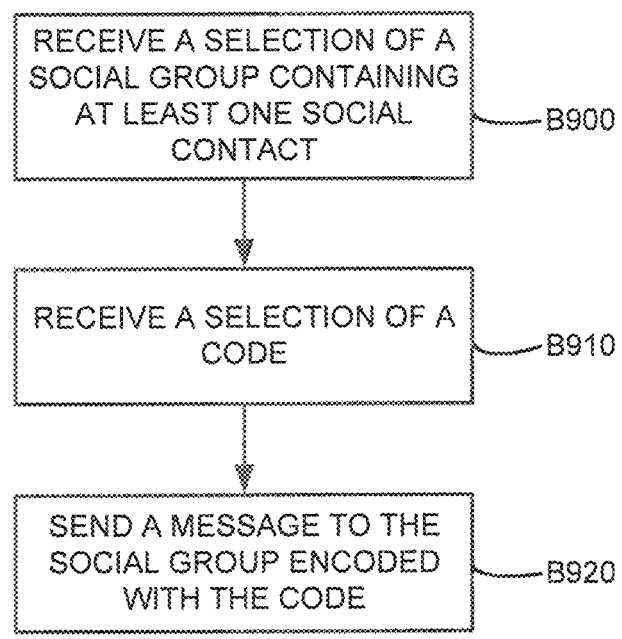
FIG. 9 is a flow diagram of a method in accordance with the subject technology according to one embodiment of the invention.

FIG. 9 is a flow diagram of a method in accordance with the subject technology. In block B900, a selection of a social group is received containing at least one social contact. The social group may be one social contact (an individual) or a group of people. If one or more of the social contacts are not already members of the system, an invitation message may be sent via text or email, providing the social contact with instruction on how to join. The instruction may include information on how to create a user account and/or instructions on how to download software on the user's portable computing device, such as a client device. In block B910, a selection of a code is received. In the selection of code, the user may create an alphabet by selecting which emoji will represent each individual letter. In other embodiments, the user may select which algorithm will be used to encode the emoji. The user then inputs a message into the user's client device via a peripheral device such as a touch screen, keyboard, or microphone. The un-coded message may appear for a short time on the user's screen to provide the user with a simple way for the user to confirm that the entered message was the intended message by the user. This feature may be able to be manually turned off in the settings. In one embodiment, the user may speak his message into a microphone, and speech to text analysis may be performed. In this embodiment, the user may pre-select the length of time the message will be displayed in text form before it is converted to code. This selectable delay ensures that the user can determine that the message is correct before encoding and transmission. In B920, a message is sent to the social group encoded with the code.

Figure 10:
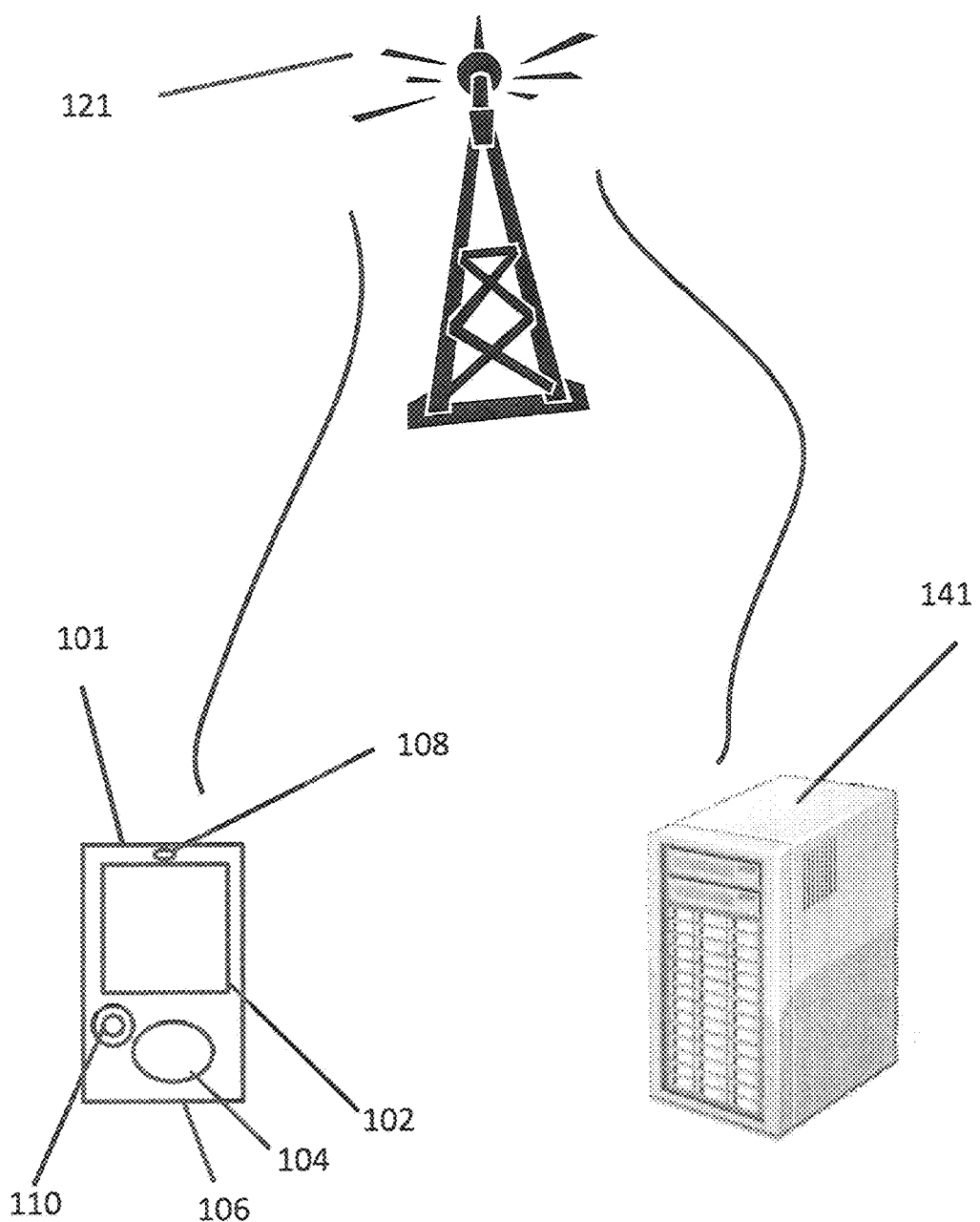
FIG. 10 is an illustration of a sample computing environment physically configured to execute the embodiments of the method according to one embodiment of the invention.

FIG. 10 may be a high level illustration of some of the elements in a sample computing system that may be physically configured to execute the various embodiments of the method. The computing system may be a dedicated computing device 141, a dedicated portable computing device 101, an application on the computing device 141, an application on the portable computing device 101 or a combination of all of these. FIG. 11 may be a high level illustration of a portable computing device 101 communicating with a remote computing device 141 through a communication device 121 but the application may be stored and accessed in a variety of ways. In addition, the application may be obtained in a variety of ways such as from an app store, from a web site, a Wi-Fi system, etc. There may be various versions of the application to take advantage of the benefits of different computing devices, different computing languages and different API platforms. As illustrated in FIG. 10, the customized, encoded messages are sent and received by the system in a variety of ways. In some embodiments, the portable computing devices 101 with near field communication (NFC) capability may be used to communicate the messages to remote computing devices 141. In yet additional embodiments, the data may be typed in by a user, such as a user of a personal computer, smart phone, tablet, or other communication device. As can be understood, the relevant transaction data may be entered manually or may be communicated in an electronic fashion, such as through a communication device 121 and using Wi-Fi, Ethernet, NFC, infrared, high frequency communication systems or any other electronic communication format. Logically, the message may be encrypted in other ways and the code may also be used as part of an encryption key. Additional information may be sent such as music, pictures sound or other media.

In one embodiment, a portable computing device 101 may be a device that operates using a portable power source 155 such as a battery (FIG. 11). Referring to FIG. 10, the portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 110 to communicate sounds.

The portable computing device 101 may be able to communicate with a computing device 141 or a plurality of computing devices 141 that make up a cloud of computing devices through a communication device 121. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication device or network of devices 121 such as cellular service, through the Internet, through a private network, through Bluetooth, through near field communications, etc. FIG. 11 may be a simplified illustration of the physical elements that make up a portable computing device 101 and FIG. 12 may be a simplified illustration of the physical elements that make up a server type computing device 141.

Referring to FIG. 11, a sample portable computing device 101 may be physically configured according to a method to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination. The portable computing device 101 may act as the display 102 or may be a part of the display 102.

The physical elements that make up the remote computing device 141 may be further illustrated in FIG. 12. At a high level, the computing device 141 may include a digital storage such as a magnetic disk, an optical disk, flash storage, non-volatile storage, etc. Structured data may be stored in the digital storage such as in a database. The server 141 may have a processor 300 that is physically configured according to computer executable instructions. It may also have a sound and video module 305 which assists in displaying video and sound and may turn off when not in use to conserve power and battery life. The server 141 may also have volatile memory 310 and non-volatile memory 315.

The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the server 141 and the number and types of computing devices 141 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The input/output interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer-implemented method for sending custom encoded messages amongst a customized social group comprising:
    receiving from a user a selection of intended recipients within a subgroup from a list of contacts on a client device via a graphical user interface (GUI) of a client app;
    determining all of the selected recipients are capable of receiving a custom encoded message based on an account associated with the client app registered at a remote communications server;
    in response to the determination being negative, sending an invitation email to one or more of the selected recipients who are not capable of receiving the custom encoded message, wherein the invitation email comprises information to enable a device of the one or more of the intended recipients having the client app in to receive the custom encoded message;
    in response to the determination being affirmative:
    receiving a message from the user intended for the selected recipient;
    encoding an assignment from the user of a graphical symbol displayed on the GUI to an alphabet for generating the custom encoded message;
    storing the encoded assignment associating with all of the intended recipients in a memory of the client device;
    transmitting the encoded assignment and the message to the remote communications server for converting the message to the custom encoded message based on the assignment, wherein the remote process is configured to transmit the custom encoded message, the message, and the assignment to the device for displaying on the device via the client app, wherein displaying of the custom encoded message, the message, and the assignment comprises displaying in response to an autodestruct setting and a reveal setting, wherein the autodestruct setting defining a length of time when the message disappears on the device, wherein the reveal setting defines a length of time after the message is visible to the selected recipients after receipt, wherein the autodestruct setting and the reveal setting are configurable by the user.

2. The computer-implemented method according to claim 1, further comprising:
    in response to the determination being negative:
    receiving an instruction from the user to send the message to one or more of the selected recipients who are not capable of receiving the custom encoded message;
    receiving an instruction from the user to cancel the message to the one or more of the selected recipients who are not capable of receiving the custom encoded message; or
    receiving an instruction from the user to send the custom encoded message to all of the intended recipients.

3. The computer-implemented method according to claim 2, further comprising notifying the user in response to the determination being negative.

4. The computer-implemented method according to claim 1, wherein the message comprises a text-based message.

5. The computer-implemented method according to claim 1, wherein the message comprises a spoken language message.

6. The computer-implemented method according to claim 5, further comprising:
    converting the spoken language message another text-based message;
    receiving a selection of a length of time to display the another text-based message; and
    displaying the another text-based message on a display of the client device.

7. The computer-implemented method according to claim 1, further comprising receiving a modification to the assignment from the one of the selected recipients and sending the modification to the user and other members of the subgroup.

8. A computer-implemented method for graphically sending a custom encoded message from a message amongst a customized social group comprising:
    a memory storing instructions;
    and at least one hardware processor to execute the instructions to:

receiving from a user a selection of intended recipients within a subgroup from a list of contacts via a graphical user interface (GUI) of a client app;

determining all of the selected recipients are capable of receiving the custom encoded message based on an account associated with the client app registered at a remote communications server;

in response to the determination being affirmative:

receiving a message from the user intended for the selected recipient;

encoding an assignment from the user of a graphical symbol displayed on the GUI to an alphabet for generating the custom encoded message;

storing the assignment associating with all of the intended recipients in a memory of the client device;

transmitting the assignment and the message to the remote communications server for converting the message to the custom encoded message based on the assignment, wherein the remote communication server is configured to transmit the custom encoded message, the message, and the assignment to the device, wherein the device provides the custom encoded message via the client app, wherein provision of the custom encoded message, the message, and the assignment comprises providing in response to a length of time when the message is visible to the selected recipients, wherein the length of time is configurable by the user.

9. The computer-implemented method according to claim 8, further comprising:

in response to the determination being negative, providing the user with one or more of the following options for selection:

receiving an instruction from the user to send the message to one or more of the selected recipients who are not capable of receiving the custom encoded message;

receiving an instruction from the user to cancel the message to the one or more of the selected recipients who are not capable of receiving the custom encoded message;

receiving an instruction from the user to send the custom encoded message to all of the intended recipients; or sending an invitation email to the one or more of the intended recipients who are not capable of receiving the custom encoded message based on an email from the list of contacts, wherein the invitation email comprises information to enable a device of the one or more of the intended recipients having the client app installed to receive the custom encoded message.

10. The computer-implemented method according to claim 9, further comprising notifying the user in response to the determination being negative.

11. The computer-implemented method according to claim 8, wherein the message comprises a text-based message.

12. The computer-implemented method according to claim 8, wherein the message comprises a spoken language message.

13. The computer-implemented method according to claim 12, further comprising:

converting the spoken language message another text-based message;

receiving a selection of a length of time to display the another text-based message; and displaying the another text-based message on a display.

14. The computer-implemented method according to claim 8, further comprising receiving a modification to the assignment from one of the intended recipients and sending the modification to the user and other members of the subgroup.

15. The computer-implemented method according to claim 8, wherein transmitting comprises transmitting the assignment and the message to the remote processor for converting the message to the custom encoded message based on the assignment, wherein the remote process is configured to transmit the custom encoded message, the message, and the assignment to the device, wherein the device first provides the message within a determined period before providing the custom encoded message.

16. A computer-networked system for sending a custom encoded message from a text-based message amongst a subset of a user-defined social subgroup among social groups comprising:

a processor configured to execute processor-executable instructions stored in a memory accessible by the processor via a computing network, wherein the memory stores processor-executable instructions;

wherein the processor is configured to execute the processor-executable instructions to:

receive from a client device associated with a user a selection of intended recipients within the subgroup from a list of contacts of the user via a graphical user interface (GUI) of a client app installed on the client device;

encoding a graphical symbol to an alphabet in response to an input from the client to generate the custom encoded message;

store in the memory the encoding and the text-based message;

convert the text-based message to the custom encoded message based on the assignment; and transmit the converted custom encoded message, the text-based message and the assignment to one or more devices of the intended recipients via the computing network for displaying on each of the one or more devices via the client app, wherein displaying of the custom encoded message, the text-based message, and the assignment comprises displaying in response to a length of time when the text-based message is visible to the selected recipients, wherein the length of time is configurable by the user.

17. The computer-networked system according to claim 16, wherein the processor is configured to execute processor-executable instructions to:

determine all of the intended recipients are capable of receiving the custom encoded message based on an account associated with the client app registered at a remote communications server;

in response to the determination being negative, provide the user with one or more of the following options:

send the text-based message to one or more of the intended recipients who are not capable of receiving the custom encoded message;

cancel the custom encoded message to the one or more of the intended recipients who are not capable of receiving the custom encoded message;

send the custom encoded message to all of the intended recipients; or sending an invitation email to the one or more of the intended recipients who are not capable of receiving the custom encoded message based on an email from the list of contacts, wherein the invitation email comprises information to enable a device of the one or more of the intended recipients to receive the custom encoded message; and wherein the processor is configured to execute processor-executable instructions to receive responses to the provided options.

18. The computer-networked system according to claim 17, wherein the processor is configured to execute process-executable instructions to determine in response to identifying a status of a register account by each of the intended recipients.

19. The computer-networked system according to claim 16, wherein the processor is configured to execute processor-executable instructions to:

receive a spoken language message;

convert the spoken language message another text-based message;

receive a selection of a length of time to display the another text-based message; and provide the another text-based message on a display of the client device.

20. The computer-networked system according to claim 16, wherein the processor is configured to execute processor-executable instructions to receive a modification to the assignment from one of the intended recipients and send the modification to the user and other members of the subgroup.

* * * * *